United States Patent Office 2,721,113
Patented Oct. 18, 1955

2,721,113
PRODUCTION AND USE OF SOLUTIONS OF PARTLY HYDROLYSED ACRYLONITRILE POLYMERS

John Downing, Arthur Hodge, and James Gordon Napier Drewitt, Spondon, near Derby, England, assignors to British Celanese Limited, a corporation of Great Britain No Drawing. Application January 13, 1953, Serial No. 331,115

Claims priority, application Great Britain June 29, 1950

15 Claims. (Cl. 18—54)

This application, which is a continuation in part of our application Ser. No. 231,665, filed June 14, 1951, relates to the production and use of solutions of partially hydrolysed acrylonitrile polymers, that is of partially hydrolysed polyacrylonitrile and partially hydrolysed copolymers of acrylonitrile and other monovinyl compounds, in which copolymers the acrylonitrile (reckoned as the unhydrolysed compound) preponderates, and especially in which the proportion of acrylonitrile (on the same basis) is 85% or more. Examples of monovinyl compounds with which the acrylonitrile may be copolymerised are substituted acrylonitriles, e. g. methacrylonitrile; vinyl esters, e. g. vinyl chloride and vinyl acetate; acrylic acid derivatives, e. g. methyl acrylate and phenyl acrylate; styrene and its derivatives; and vinylidene chloride. One example of a copolymer which may be simultaneously dissolved and partially hydrolysed in accordance with the invention is the copolymer obtained from polyacrylonitrile and vinyl chloride in which the proportion of acrylonitrile is 85% or more. The invention is however principally concerned with polyacrylonitrile itself and its partial hydrolysis products, and will be described with particular reference thereto.

In our application Ser. No. 231,665 we have shown that acrylonitrile polymers can be dissolved in aqueous formic acid of concentration above 70%, especially 80–90%, at temperatures above 120° C., and that the solutions so obtained may be used for the formation of one- and two-dimensional shaped articles such as fibres and films.

We have now found that shaped articles made from solutions of polyacrylonitrile in aqueous formic acid have an affinity for acid dyestuffs that is quite uncharacteristic of polyacrylonitrile articles in general, and that this is due to the occurrence of a degree of hydrolysis of the polyacrylonitrile under the influence of the aqueous formic acid. Similarly in copolymers dissolved in aqueous formic acid, the acrylonitrile component undergoes a degree of hydrolysis. Primarily the hydrolysis converts a proportion of the nitrile groups into amide groups.

The conditions under which the acrylonitrile polymer is dissolved in the aqueous formic acid are set out in our application Ser. No. 231,665. In particular it is preferred to employ formic acid of concentration 80–90%, though higher concentrations, e. g. up to 98%, can be used; commercial formic acid of concentration about 85% is very suitable. Solution is preferably effected at a temperature between 120° and 180° C., and especially between 140° and 175° C., under the developed pressure.

The degree to which the polymer is hydrolysed is dependent on the concentration of the formic acid, the temperatures at which the solution is formed, maintained and used, and the time for which the polymer is in contact with the aqueous acid. For example, fibres having both good textile properties and a useful degree of affinity for acid dyes may be made from polyacrylonitrile or acrylonitrile copolymers in which the nitrogen content of the polyacrylonitrile, or of the acrylonitrile component of a copolymer, has been reduced to a value between 15 and 23%. Partially hydrolysed polymers having nitrogen contents within this range may be obtained by dissolving the unhydrolysed polymer in aqueous formic acid under only moderately rigorous conditions, and subsequently either using the solution almost at once, or keeping it at a relatively low temperature, e. g. between about 20° and 50° C., until it is used. For example, the polymer may be dissolved in aqueous formic acid of concentration about 80–85% at a temperature of 140°–165° C.; preferably the aqueous formic acid is vigorously stirred, and the polymer is initially in a form having a high surface:volume ratio, such as a finely granular form or other finely divided form, so as to cause the polymer to dissolve as quickly as possible, and so keep short the time during which it is exposed to conditions favouring rapid hydrolysis. As soon as a clear homogeneous solution has been formed it is preferably cooled, for example to about 70°–100° C. if it is to be used at once, or to about 20°–50° C. if it is to be kept for a period before use.

When the solutions are to be used in the production of one- and two-dimensional shaped articles, such as fibres and films, by extrusion or casting methods, it is preferable that the viscosity of the polyacrylonitrile or other acrylonitrile polymer, before it is dissolved in the aqueous formic acid, should be between about 2.5 and 4 centistokes, and especially between about 3 and 3.5 centistokes, measured in 1% solution in dimethyl formamide at 20° C. The concentration of the solution, as calculated from the weight of the polymer before any hydrolysis occurs and the weight of the aqueous formic acid in which it is to be dissolved, is preferably between about 5% and 25% and especially 7.5–20%, concentrations of 10%–20% being particularly useful.

The shaped articles may be made by extruding or casting the solution into a coagulating liquid, advantageously a carboxylic acid ester of boiling point above 250° C., especially a dialkyl phthalate, as described in United States application Ser. No. 257,198, filed November 19, 1951, of J. Downing and J. G. N. Drewitt. The spinning solution is preferably at a temperature between about 70° and 100° C., and the coagulating liquid may be at a temperature approximately equal to or slightly higher than that of the spinning solution.

Fibres made in accordance with the invention are preferably oriented by stretching in order to increase their tenacity. A certain degree of stretch may be imparted to the fibres in the course of the spinning operation, but whether this is done or not the fibres are preferably stretched by several times, e. g. by 5–15 times, their length in a subsequent operation. For example the fibres, after leaving the coagulating bath, may be wound up and washed (e. g. in the form of multi-filament yarns), and then stretched while heated; for example they may be stretched in hot air, wet steam, or water at a temperature above 80° C., or while they are passed in contact with a hot metal surface, e. g. the surface of a plate or roller kept at about 120°–160° C. To obtain a yarn of the highest tenacity it is advantageous to stretch the fibres as soon as possible after coagulation is complete; for example they may be stretched continuously with their formation, if desired after an intermediate wash with water. If the separate filaments in a multi-filament yarn show any tendency to stick together or coalesce during the stretching operation, this can generally be prevented by passing the yarn through an aqueous oil emulsion, or otherwise applying an aqueous oil emulsion to the yarn, before it is heated and stretched, or by carrying out the stretching operation in an aqueous oil emulsion at an elevated temperature, especially at a temperature above 80° C. After being stretched the fibres may be treated to increase their extensibility by heating them, e. g. to about 120°–200° C., in the absence of tension until no more shrinkage takes place.

Films and like two-dimensional articles made in accordance with the invention may also be stretched to increase their tenacity.

While the solutions of the invention are of particular value in the production of fibres and films and other one- and two-dimensional shaped articles by extrusion or casting methods, they may also be employed for other purposes, e. g. for the production of coatings of acrylonitrile polymers.

The invention is further illustrated by the following examples.

*Example I*

A polyacrylonitrile made by polymerising acrylonitrile in 18 times its weight of water using as catalyst ammonium persulphate, and having a viscosity (in a 1% dimethyl formamide solution at 20° C.) of about 3.25 centistokes, was heated in a closed vessel to about 145° C. with 6 times its weight of 85% aqueous formic acid. A clear solution was obtained which could be cooled to about 70° C. without gelling.

*Example II*

The solution obtained in Example I was cooled to 90° C., and at this temperature was extruded in the form of filaments into a coagulating bath of dibutyl phthalate also at 90° C. The filaments so obtained were formed into a yarn; the yarn was passed over a guide whereby part of the adherent dibutyl phthalate was removed, and was then at once stretched to 6 times its original length while passing over a metal plate heated to 150° C. The stretched yarn was then heated to 130° C. while in a relaxed state and allowed to shrink freely. It had good textile properties, and possessed a useful degree of affinity for acid dyes.

Having described our invention, what we desire to secure by Letters Patent is:

1. As new compositions, solutions in aqueous formic acid of concentration above 70% of polymers selected from the group which consists of partially hydrolysed polyacrylonitrile and partially hydrolysed copolymers of acrylonitrile with another monovinyl compound in which copolymers the acrylonitrile, reckoned as the unhydrolysed compound, preponderates.

2. As new compositions, solutions in aqueous formic acid of concentration 80–90% of polymers selected from the group which consists of partially hydrolysed fibre-forming polyacrylonitrile and partially hydrolysed fibre-forming copolymers of acrylonitrile with another monovinyl compound, the said copolymers containing at least 85% by weight of acrylonitrile reckoned as the unhydrolysed compound.

3. Compositions according to claim 1, wherein the nitrogen content of the partially hydrolysed acrylonitrile in the polymer is 15–23%.

4. Compositions according to claim 2, wherein the nitrogen content of the partially hydrolysed acrylonitrile in the polymer is 15–23%.

5. Process for obtaining a partially hydrolysed acrylonitrile polymer in solution, which comprises maintaining a polymer, selected from the group which consists of polyacrylonitrile and copolymers of acrylonitrile with another monovinyl compound in which copolymers the acrylonitrile preponderates, in contact with aqueous formic acid of concentration at least 70% at a temperature of 120°–180° C. until a clear homogeneous solution has been formed.

6. Process for obtaining a partially hydrolysed acrylonitrile polymer in solution, which comprises maintaining a polymer, selected from the group which consists of fibre-forming polyacrylonitrile and fibre-forming copolymers of acrylonitrile and another monovinyl compound, the said copolymers containing at least 85% of acrylonitrile, in contact with aqueous formic acid of concentration 80–90% at a temperature of 140°–175° C. until a clear homogeneous solution has been formed.

7. Process according to claim 6, wherein the polymer which is to be hydrolysed and dissolved is in a finely divided form and the aqueous formic acid is stirred vigorously until solution is complete.

8. Process according to claim 6, wherein the polymer which is to be hydrolysed and dissolved has a viscosity, measured in 1% solution in dimethyl formamide at 20° C., between 2.5 and 4 centistokes.

9. Process for obtaining a partially hydrolysed acrylonitrile polymer in solution, which comprises maintaining a polymer, selected from the group which consists of fibre-forming polyacrylonitrile and fibre-forming copolymers of acrylonitrile and another monovinyl compound, the said copolymers containing at least 85% of acrylonitrile, in contact with 3–19 times its weight of aqueous formic acid of concentration 80–90% at a temperature of 140°–175° C. until a clear homogeneous solution has been formed.

10. Process according to claim 7, wherein the viscosity of the polymer which is to be hydrolysed and dissolved, measured in 1% solution in dimethyl formamide at 20° C., is between 2.5 and 4 centistokes, and one part by weight of the polymer is dissolved in 4–9 parts by weight of the aqueous formic acid.

11. Process for the manufacture of fibres, films and other one- and two-dimensional shaped articles of partially hydrolysed acrylonitrile polymers, which comprises maintaining a polymer, selected from the group which consists of fibre-forming polyacrylonitrile and fibre-forming copolymers of acrylonitrile with another monovinyl compound in which copolymers the acrylonitrile, reckoned as the unhydrolysed compound, preponderates, in contact with aqueous formic acid of concentration at least 70% at a temperature of 120°–180° C. until a clear homogeneous solution has been formed, and subsequently shaping the solution and setting it by means of a coagulating liquid.

12. Process for the manufacture of fibres, films and other one- and two-dimensional shaped articles of partially hydrolysed acrylonitrile polymers, which comprises maintaining a polymer, selected from the group which consists of fibre-forming polyacrylonitrile and fibre-forming copolymers of acrylonitrile and another monovinyl compound, the said copolymers containing at least 85% by weight of acrylonitrile reckoned as the unhydrolysed compound, in contact with aqueous formic acid of concentration 80–90% at a temperature of 140°–175° C. until a clear homogeneous solution has been formed, and subsequently shaping the solution and setting it by means of a coagulating liquid.

13. Process according to claim 12, wherein the temperatures at which the solution is formed, maintained and shaped, and the time elapsing between the first contact of the polymer with the aqueous formic acid and the shaping of the solution, are so correlated that when the solution is shaped the nitrogen content of the polymer, calculated on its initial acrylonitrile content, is between 15 and 23%.

14. Process according to claim 12, wherein the viscosity of the polymer before it is dissolved in the aqueous formic acid, measured in 1% solution in dimethyl formamide at 20° C., is 2.5–4 centistokes, and the polymer is dissolved in 3–19 times its weight of aqueous formic acid.

15. Process according to claim 11, wherein the shaped solution is set by means of a liquid carboxylic acid ester of boiling point above 250° C.

References Cited in the file of this patent

UNITED STATES PATENTS

| | | |
|---|---|---|
| 2,210,771 | Myles et al. | Aug. 6, 1940 |
| 2,588,335 | Dalton | Mar. 11, 1952 |